MEMORY CIRCUITS INCLUDING A MAGNETIC OVERLAY

Filed Aug. 7, 1962 2 Sheets-Sheet 1

INVENTORS: A. H. BOBECK
J. L. SMITH
BY John F Powell
ATTORNEY

INVENTORS: A. H. BOBECK
J. L. SMITH
BY John F Powell
ATTORNEY

United States Patent Office 3,295,113
Patented Dec. 27, 1966

3,295,113
MEMORY CIRCUITS INCLUDING A MAGNETIC OVERLAY

Andrew H. Bobeck, Chatham, and James L. Smith, Bedminster, N.J., assignors to Bell Telephone Laboratories, Incorporated, New York, N.Y., a corporation of New York Filed Aug. 7, 1962, Ser. No. 215,448
13 Claims. (Cl. 340—174)

This invention relates to information storage arrangements and more particularly to such arrangements in which information is stored in the form of remanent flux states of magnetic memory elements.

Magnetic information storage arrangements employing magnetic memory elements as information storage addresses are well known in the information handling and processing art. The substantially rectangular hysteresis characteristics of the magnetic materials of which such memory elements are fabricated enable the elements to store binary values by being magnetized in either of two remanent flux states. The well known toroidal core, for example, has one binary value associated with one of the remanent states and the other binary value with the other of the remanent states. Which of the binary values is stored in the core at any given time is determined by applying a read out current pulse to a winding inductively coupled to the core. Should a reversal of the magnetic flux from one of its remanent states to the other remanent state occur as a result of the applied read out current pulse, a voltage will be induced across a sensing winding also inductively coupled to the core, which voltage will be indicative of a particular binary value.

A well known toroidal core arrangement suitable for a high speed, word organized memory array utilizes two such cores for each bit storage address of the array. A word conductor threads both cores in the same sense and a bit conductor threads the cores in opposite senses. Information is written into the address by the simultaneous application of signals to the word and bit conductors with the result that magnetic fields applied to the two cores are the result of the additive and subtractive effects, respectively, of the signals. Consequently, the cores are driven from uniform magnetic conditions to two different magnetic conditions. A subsequent read out signal applied to the word conductor induces a signal in the bit conductor, the polarity of which is indicative of the binary value stored. Since the magnitude of signals applied to the word conductor is not limited to a "half-select" value, faster operation is achieved than that realized in coincident current operation. However, since the cores must be driven to different magnetic states, and each core has a relatively small amount of flux available for switching, the magnitude of the write signal applied to the word conductor must still be restricted in magnitude.

It is an object of this invention to provide a word organized magnetic memory circuit utilizing two memory cells per bit address in which a fast read-write cycle time is achieved and the use of write signals of a greater allowable range of magnitudes is permitted.

It is another object of this invention to provide a word organized magnetic memory circuit utilizing two memory cells per bit address in which the amount of flux in each cell available for switching is much greater than in analogous circuits utilizing conventional toroidal magnetic cores as the memory cells thereof.

Patent 2,825,891 of S. Duinker, issued March 4, 1958, discloses an information storage arrangement in which the input and read out current pulses utilize considerably less power and may recur more frequently than in toroidal core memory circuits. The circuit includes a high magnetic permeability base plate having narrow recesses therein, conductors positioned in the recesses and magnetic material having substantially rectangular hysteresis characteristics bridging the recesses.

A severe limitation of the circuit disclosed in the Duinker patent, hereinbefore cited, results, however, because of noise problems inherent therein. Thus, whenever a signal is applied to any conductor of this circuit, noise signals are generated in all other conductors of the circuit which at any point are closely parallel to or which nonorthogonally intersect this conductor within any of the recesses. The noise signals are a result of the close inductive coupling which exists between these conductors due to the high permeability magnetic base plate which almost completely surrounds them. A substantial signal-to-noise problem inevitably accompanies the use of this circuit.

Accordingly, it is another object of this invention to provide a magnetic memory circuit in which the signal-to-noise disadvantage of the circuit of the Duinker patent is overcome; furthermore, as described hereinafter, other advantages over this circuit are achieved and the advantages possessed by this circuit are maintained.

Another well known magnetic memory device is the magnetic wire memory element commonly known as the "twistor" which is described in the copending application of A. H. Bobeck, Serial No. 675,522, now Patent No. 3,083,353, filed August 1, 1957. A specific memory circuit utilizing such wire memory elements in a word organized memory using two memory cells per bit address is described in the copending application of A. H. Bobeck, Serial No. 19,402, now Patent No. 3,105,962, filed April 1, 1960. Information is stored in the memory during the write phase of operation by means of coincident half-select currents. A half-select current of one polarity is applied to a flat strip solenoid loop and half-select currents of predetermined polarities are applied to a plurality of wire memory elements which pass in one direction through the solenoid loop, are folded, and then pass again through the loop in the opposite direction.

It is another object of this invention to provide a word organized magnetic memory circuit utilizing magnetic wire memory elements and two memory cells per bit address in which a fast read-write cycle time is achieved but with a wider allowable range of write signal magnitudes than that realized in the circuit of the last-mentioned copending application of A. H. Bobeck.

The above and other objects are realized in one embodiment according to the principles of this invention which comprises a high magnetic permeability base plate having a plurality of pairs of rectangular posts formed thereon and a sheet of magnetic material having a substantially rectangular hysteresis characteristic positioned across the tops of the posts. The pairs of posts are arranged in rows and columns on the base plate while the posts of each pair are arranged at an angle such that a relatively narrow gap length exists between the posts at one end while a relatively wide gap length exists at their other end. Each pair of posts comprises a magnetic cell and adjacent ones of the cells aligned along a single row comprise a bit address. Information is stored on a word organized basis with a word winding inserted between the pairs of posts of each row. Bit conductors pass in zigzag fashion between the posts of each column such that each bit address has a single bit conductor passing in one sense between the posts of one cell of the address and in the opposite sense between the posts of the other cell of the address. Each bit conductor passes through the posts of one bit address associated with each of the word conductors.

Since the base plate and posts are constructed of a high permeability material, the total reluctance of a flux path passing through the base plate, a pair of posts and the overlay sheet depends almost entirely upon the reluctance of the portion of its length which passes through the square loop overlay material. Thus, due to the angular positioning of the two posts of each cell relative to each other, a flux path at the ends of the posts having a narrow gap length therebetween passes through a shorter length of the overlay sheet and therefore has a lower reluctance than a flux path at the ends of the posts having a wide gap length therebetween. Flux paths between the ends of the posts exhibit reluctance values intermediate those at the ends. Due to the different values of reluctance exhibited by the flux paths, different values of magnetomotive force are required to switch flux in these paths from one remanent state to an opposite remanent state. The flux paths, by including different lengths of the overlay sheet, are identical to flux paths of equal length within magnetic materials exhibiting different coercive forces and will be considered to have different apparent coercive forces.

During the write phase of operation a write signal applied to a selected word conductor is of a polarity and magnitude sufficient to produce a magnetizing force which reverses the flux in approximately half of the flux paths of each of its associated memory cells from a remanent condition uniform to all of the flux paths to an opposite remanent condition. Simultaneously with the write signal applied to the word conductor, write signals of predetermined polarity are applied to each of the bit conductors. In each bit address associated with the selected word conductor the magnetizing force produced by the signal applied to its bit conductor will in one memory cell aid and in the other cell oppose that produced by the signal on the word conductor. As a result, more than half the flux of one cell and less than half of the other cell will undergo switching during the write phase of operation. The particular binary value stored in a given bit address depends upon which of its cells experiences the greater flux reversal which, in turn, is determined by the polarity of the write signal applied to its bit conductor. Interrogation is achieved by applying a read out signal to a selected word conductor of a polarity opposite from that of the previous write signal and of a magnitude sufficient to reestablish uniform remanent magnetic conditions in each memory cell associated with the selected word conductor. Signals induced in the bit conductors during interrogation are detected, their polarities manifesting the information stored in respective ones of the addresses.

The write signal applied to the word conductor is not limited in magnitude to a value insufficient to cause switching in its associated bit addresses. Moreover, it is not even limited in magnitude to a value such that no switching is caused in a memory cell to which word and bit write signals producing opposing magnetizing fields are applied. By using memory cells including a plurality of flux paths having different values of reluctance, and by using two such memory cells per bit address, write signals of greater magnitude may be utilized.

Additionally, this invention permits the magnitude of the write signal applied to the word conductor to vary over a relatively wide range. Since the effect of the write signals applied to the bit conductors is to modulate the magnetizing force produced by the write signals applied to the word conductors, the difference in the amount of flux switched in the two memory cells of each bit address depends primarily upon the magnitude of the write signals applied to the bit conductors. This difference in turn determines the magnitude of output signals induced in the bit conductors. Therefore, the magnitude of the write signal applied to the word conductors may vary considerably without causing any substantial change in the subsequent output signals.

The noise problems of the circuit described in the Duinker patent, previously referred to, are greatly diminished by cancellation during interrogation of noise signals induced in the bit conductors. In each address interrogated, noise signals induced in a bit conductor, by a signal applied to the word conductor, are of opposite polarity in the two cells of the address and cancel. The signals induced in the bit conductor by flux switching in the square loop overlay material are also of opposite polarity in the two cells; however, the two signals are of different magnitudes, the smaller signal merely reducing the magnitude of the resultant signal, the polarity of which is indicative of the binary value stored in the address.

Another embodiment according to the principles of this invention comprises a circuit utilizing a plurality of magnetic wire memory elements and a plurality of flat strip solenoids arranged transversely to the wire elements and in inductive coupling therewith. Each wire element is folded to enable it to cross each solenoid twice. A bit address is defined at the two segments of each wire element crossed by each solenoid, each segment comprising one of two memory cells of the address. The illustrative arrangement being considered is word organized with the strip solenoids defining the words and the doubled wire elements defining corresponding bits of the words.

Information is written into a selected bit address by establishing different levels of remanent magnetization in the memory cells of the selected address. This is achieved by using solenoids having a tapered cross section such that they are substantially thicker along one edge than along the other. Because of the taper, a greater portion of an applied current signal flows through the thick than through the thin portion of the solenoid. As a result, a greater magnetizing force is effected in the vicinty of the thick edge of the solenoid than in the vicinity of its thin edge. A write current signal is applied to a selected word solenoid simultaneously with the application of write current signals of predetermined polarity to each of the magnetic wire memory elements themselves. The write signal applied to the solenoid is of a polarity and magnitude sufficient to reverse the flux along approximately half the length of each segment of the wire elements crossed by the selected solenoid from a remanent magnetic condition uniform to each segment to the opposite remanent condition. The write signals applied to the wire elements effect magnetic fields which aid in one memory cell and oppose in the other cell of each address associated with the selected solenoid the field effected by the write current signal applied to the solenoid. As a result of the simultaneously applied write signals, flux is reversed along less than half of the length of each segment comprising one cell of each address and along more than half of the length of each segment comprising the other cell of each address. The particular binary value stored in each address depends upon which of its cell experiences a flux reversal along a greater portion of its length which in turn is governed by the polarity of the write signal applied to its wire element. Interrogation is achieved by applying a read out signal to a selected word solenoid of a polarity opposite from that of the previously applied write signal and of a magnitude sufficient to reesablish uniform remanent magnetic conditions in each memory cell associated with the solenoid. Signals induced in the wire elements during interrogation are detected, their polarities manifesting the information stored in respective ones of the addresses.

The write signal applied to the word solenoid may also be of greater magnitude than in previous similar memory circuits and may be permitted to vary in magnitude over a relatively wide range.

Thus according to one feature of one embodiment of this invention a magnetic memory array utilizing a high permeability base plate having a plurality of posts extending therefrom and a square loop material positioned across the posts to form a plurality of magnetic cells has each cell defined therein by two of said posts which are positioned angularly to each other such that a plurality of flux paths in each cell pass through varying lengths of said square loop material.

According to a feature of another embodiment of this invention a magnetic memory array utilizing a plurality of magnetic wire memory elements and a plurality of flat strip solenoids inductively coupled thereto utilizes solenoids having a tapered cross section.

A more complete understanding of this invention and of the above and other objects and features thereof may be gained from a consideration of the following detailed description together with the accompanying drawing in which.

Figure 1:
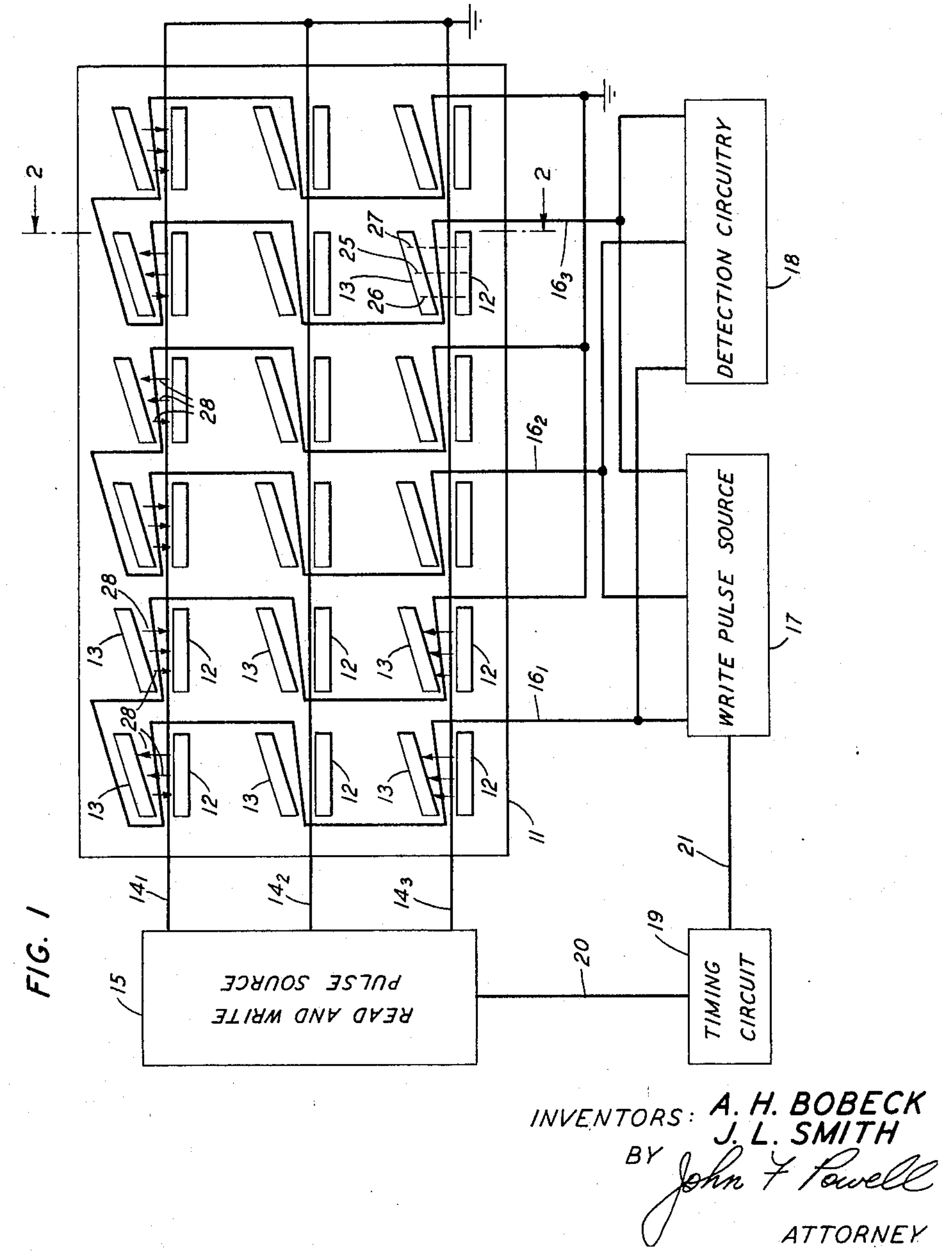
FIG. 1 depicts one specific embodiment of a memory array according to the principles of this invention.

A specific illustrative embodiment of a memory array according to this invention is shown in FIG. 1. A high permeability base plate 11 is shown having a plurality of pairs of posts thereon arranged in three rows of six columns. Each pair of posts includes a lower rectangular post 12 positioned horizontally on the plate 11 as viewed in FIG. 1 and an upper substantially rectangular post 13 positioned at an angle to post 12 such that its left end, as viewed in FIG. 1, is close to the left end of post 12 while its right end is substantially further removed from the right end of post 12. The plate 11 with its posts 12 and 13 may, for example, be of pressed ferrite with the posts 12 and 13 formed thereon during the fabrication process.

Word conductors $\mathbf{14_1}$ through $\mathbf{14_3}$ are positioned between the posts 12 and 13 of respective ones of the three rows and are connected between ground potential and pulse source 15. Bit conductors $\mathbf{16_1}$ through $\mathbf{16_3}$ pass between the posts 12 and 13 in a zig-zag fashion as shown in FIG. 1 and are connected between ground potential and both pulse source 17 and detection circuitry 18. Timing circuit 19 is connected between the pulse sources 15 and 17 by conductors 20 and 21, respectively.

Figure 2:
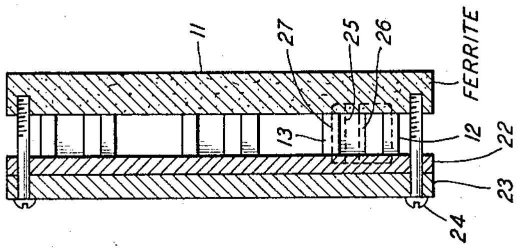
FIG. 2 depicts a sectional view of the embodiment of FIG. 1 taken along plane 2—2 shown in FIG. 1.

FIG. 2 depicts a sectional view of the embodiment of FIG. 1 taken along the plane represented by broken line 2—2 shown in FIG. 1. A sheet of magnetic material 22 having substantially rectangular hysteresis characteristics is positioned across the tops of the posts 12 and 13 as shown in FIG. 2. The magnetic sheet 22 is advantageously clamped tightly against the posts 12 and 13 in order to minimize the total reluctance of magnetic paths which include the posts 12 and 13 and the sheet 22. This clamping may be achieved, for example, by means of a metallic pressure plate 23 above the sheet 22 and clamping screws 24 between plate 23 and end portions of the base plate 11 which serve to hold sheet 22 tightly between pressure plate 23 and base plate 11. The magnetic sheet 22, pressure plate 23 and clamping screws 24 shown in FIG. 2 are, for illustrative purposes, not depicted in FIG. 1.

The pulse source 15 shown in FIG. 1 in block diagram form may comprise any well known circuitry capable of providing read and write pulses of the character described hereinafter. Similarly, pulse source 17 also shown in block diagram form may comprise any well known circuit capable of providing write pulses of the character described hereinafter. Timing circuit 19 is also shown in block diagram form and may comprise circuitry capable of timing the energization of sources 15 and 17 in the manner described hereinafter, during the write phase of operation. Detection circuitry 18 is also shown in block diagram form and may comprise well known circuitry capable of detecting signals induced in the conductors 16 during the read out phase of operation.

The word conductors 14 and bit conductors 16 define a plurality of bit addresses in the array with each bit address comprising two adjacent memory cells. Each memory cell defines a plurality of magnetic flux paths each of which includes a portion of the base plate 11, a pair of posts 12 and 13 and the overlay magnetic sheet 22. Adjacent ones of the memory cells aligned along a single row on the plate 11, as shown in FIG. 1, comprise bit addresses of the array. Thus, as depicted in FIG. 1, each row of six pairs of posts 12 and 13 comprise three bit addresses of the array. One of the word conductors 14 and one of the bit conductors 16 pass between the posts 12 and 13 of each bit address. Because of the zig-zag pattern followed by the conductors 16, the conductors 14 and 16 pass in the same sense between the posts 12 and 13 of one memory cell of each address and in the opposite sense between the posts 12 and 13 of the other memory cell.

The array of FIG. 1 is of the word-organized type. That is, a binary word is associated with each of the word conductors 14. During read out a particular binary word is interrogated by applying a read out signal from source 15 to a particular one of the conductors 14 to establish uniform remanent magnetic conditions in each of the memory cells associated with the particular conductors 14. As a result, output signals are induced in each of the bit conductors $\mathbf{16_1}$ through $\mathbf{16_3}$, the polarity of which are indicative of the binary values stored in each of the bit addresses of the word being interrogated. Bearing in mind the foregoing organization, a detailed description of the operation of this circuit will now be set forth.

Assume all of the flux paths of each of the memory cells to be in a uniform remanent magnetic condition, which may be designated a reset condition. The reset condition is represented in FIG. 1 by the three arrows directed upward in FIG. 1 between the posts of each of the two cells which constitute the bit address corresponding to word conductor $\mathbf{14_3}$ and bit conductor $\mathbf{16_1}$. The condition is realized as a result of previously applied negative read out pulses from source 15. A binary information word is written into the array by the application of write signals simultaneously to a selected one of the word conductors 14 and to each of the bit conductors 16. The pulse from source 15 is of positive polarity while the pulses from source 17 are of positive or negative polarity depending upon the particular binary values to be written into the addresses. The write signals applied to the selected conductor 14 is of a magnitude to effect flux reversals in some but not all of the flux paths in each of the memory cells through which it passes. The write signals applied to conductors 16 are of a magnitude insufficient to effect flux reversal in any flux paths of any cells through which the conductors pass unless signals are simultaneously applied to the conductors 14 associated with the cells. The write signals applied to the bit conductors 16 together with the signal applied to conductor 14 effect resultant magnetizing forces which cause flux reversals in each of the memory cells associated with the selected conductor 14. The extent of switching in each cell is different, however, than that which would be experienced as a result of the signal applied to conductor 14 alone; a greater number of flux paths in some cells experiencing switching and a lesser number of flux paths in the remaining cells experiencing switching, depending upon the additive or subtractive effect of the magnetizing forces produced by the signals on conductors 16.

The above described flux reversals may be more easily understood by reference to the drawing. Three illustrative flux paths 25, 26, and 27 are shown by dotted lines in the left hand one of the memory cells defined by conductors $\mathbf{16_3}$ and $\mathbf{14_3}$ and as viewed in FIG. 1 and in the left most one of the cells shown in the sectional view of FIG. 2. If all the flux paths of this cell are in the uniform remanent magnetic condition representative of a reset condition in the cell, a write signal of negative polarity applied to conductor $16_3$ would cause no flux reversals in the cell since the magnetizing force effected is less than the coercive force of any flux path of the cell. A positive write signal applied to conductor $14_3$ would effect flux reversals in all flux paths of the cell from the left edges of the posts 12 and 13, as viewed in FIG. 1, up to flux path 25, but would produce a magnetizing force less than the coercive force of flux paths to the right of path 25. A positive write signal applied to conductor $14_3$ simultaneously with a positive write signal applied to conductor $16_3$, would effect flux reversals in flux paths of the cell from the left edges of posts 12 and 13 only up to flux path 26 since the resultant magnetizing force is less than that produced by the write signal applied to conductor $14_3$ alone. Finally, a positive write signal applied to conductor $14_3$ simultaneously with a negative write signal applied to conductor $16_3$ would effect flux reversals in flux paths of the cell from the left edges of posts 12 and 13 to flux path 27 since the resultant magnetizing force is then greater than that produced by the write signal applied to conductor $14_3$ alone.

When information is stored in an address, one cell of the address will, therefore, exhibit a remanent state in which less than a particular number of its flux paths have undergone reversal while in the other cell more than the particular number of its flux paths have undergone reversal from a previous reset condition. The particular binary value stored in the address is thus determined by the relative magnetic conditions of its two cells.

A binary word stored in the array is interrogated by the application of a negative read out signal to a particular one of the word conductors 14 of a magnitude to reestablish the reset magnetic condition in each memory cell associated with the particular conductor. Flux reversal therefore occurs in all of these cells which induce voltage signals in each of the bit conductors 16. The flux reversal in one cell of each bit address associated with the particular conductor 14 exceeds in magnitude the reversal in the other cell of the address and therefore governs the polarity of the signal induced in the particular conductor 16 associated with the cell. Signals induced in the conductors 16 are detected by circuitry 18 and manifest by their polarity the binary word being interrogated.

If the particular binary word 101 is to be stored in the bit addresses associated with word conductor $14_1$ and bit conductors $16_1$, $16_2$, and $16_3$, respectively, for example, a positive write signal is applied to word conductor $14_1$ simultaneously with positive write signals applied to bit conductors $16_1$ and $16_3$ and a negative write signal applied to bit conductor $16_2$. The magnetization forces effected by the signals applied to the conductors are subtractive in the left hand ones of the memory cells of the bit addresses defined by conductors $14_1$ and conductors $16_1$ and $16_3$ and the right hand cell of the address defined by conductors $14_1$ and $16_2$; the forces are additive in the right hand ones of the cells of the addresses defined by conductor $14_1$ and conductors $16_1$ and $16_3$ and the left hand cell of the address defined by conductors $14_1$ and $16_2$. The resulting magnetic conditions of these addresses are indicated by the arrows 28 in FIG. 1. The upward directed arrows, as viewed in FIG. 1, indicate the direction of remanent magnetization in the flux paths of the cells associated with conductor $14_1$ when these cells are in the reset condition. Subtractive magnetizing forces produced by write signals on conductors $14_1$ and $16_1$ through $16_3$ effect magnetic conditions in the cells indicated by one downward directed arrow 28 and two upward directed arrows 28; additive magnetizing forces produced by write signals on these conductors effect magnetic conditions in the cells indicated by three downward directed arrows.

A subsequent negative polarity read out signal applied to word conductor $14_1$ reestablishes the reset condition in each memory cell associated with this conductor thereby inducing negative output signals in bit conductors $16_1$ and $16_3$ and a positive signal in bit conductor $16_2$, which signals are detected by detection circuitry 18 and are indicative of the binary word 101 stored in the interrogated bit addresses.

Because of the zig-zag wiring pattern followed by the bit conductors 16, noise signals induced in the conductors 16 during the read out phase of operation are greatly diminished by cancellation. Thus, during interrogation of the bit address defined by word conductor $14_1$ and bit conductor $16_1$ noise signals induced in the portion of conductor $16_1$ between posts 12 and 13 of the left hand cell due to the signal applied to conductor $14_1$ and the inductive coupling between the two conductors at this point, are cancelled by similar oppositely poled noise signals induced in that portion of conductor $16_1$ between posts 12 and 13 of the right hand cell. The signal induced in conductor $16_1$ by the resetting of the right hand cell is, however, only slightly diminished by the signal induced in the conductor by the resetting of the left hand cell and the resultant induced signal appearing at detection circuitry 18 is indicative of the binary value "1" stored in this address.

The embodiment of this invention just described represents a variation of circuitry described in a copending application by the present inventors, Serial No. 215,318, which is being filed on even date herewith and is to be considered incorporated by reference herein.

Other embodiments of this invention using high permeability base plates having a plurality of posts extending therefrom and a square loop overlay material may be easily devised by one skilled in the art and are considered within the scope of the present invention. Thus, for example, memory cells each having a plurality of flux paths therein including varying lengths of the square loop overlay material may be formed by cutting properly shaped slits in the overlay material rather than by positioning the two posts of each address at an angle to each other. The slits would be shaped such that flux paths at one end of a pair of posts would necessarily include a longer portion of the overlay material than would flux paths at the other end of a pair of posts.

Figures 3A, 3B:
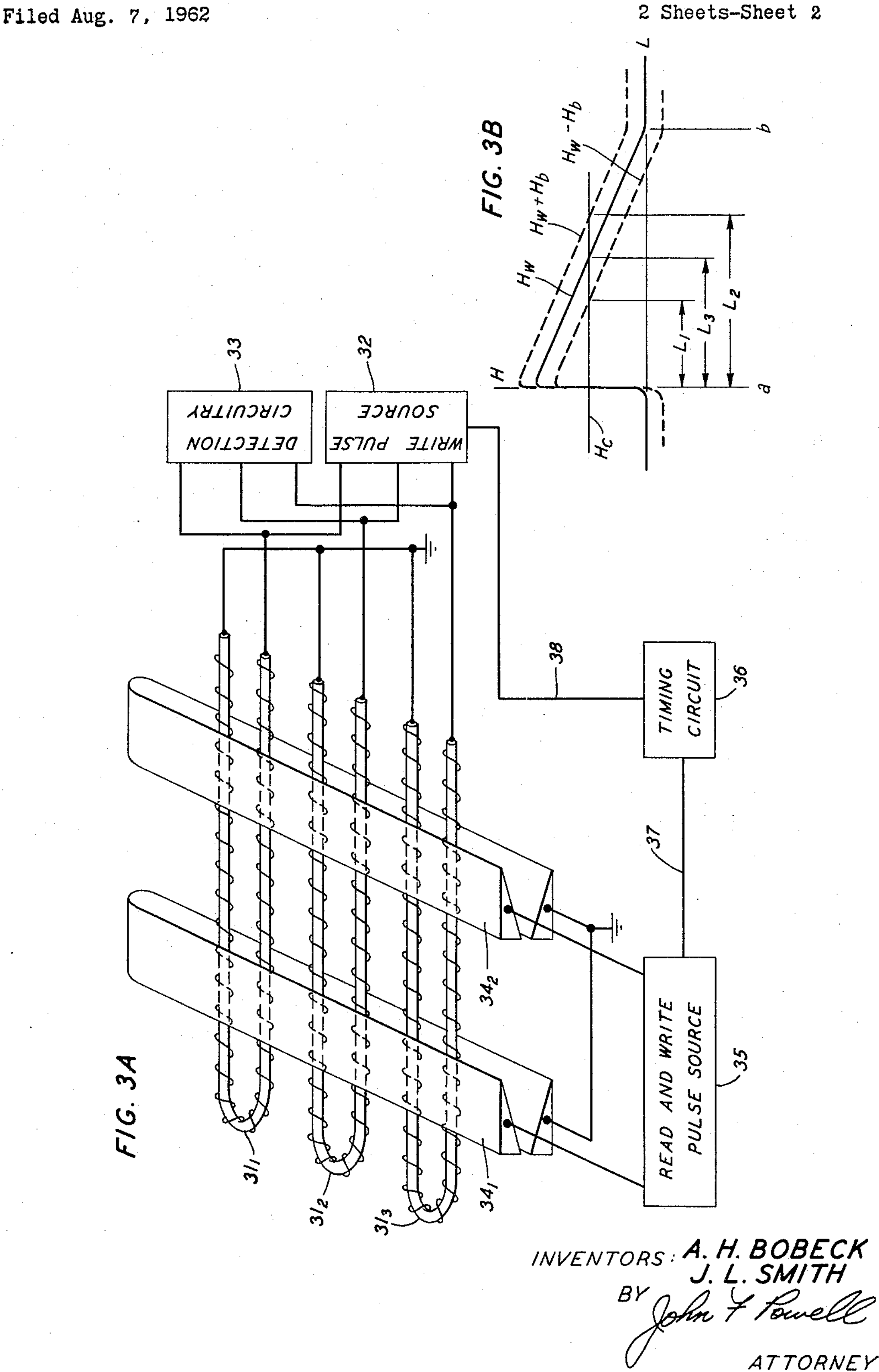
FIG. 3A depicts another specific embodiment of a memory array according to the principles of this invention which utilizes magnetic wire memory elements.
FIG. 3B depicts a graph illustrating the magnitude of magnetizing forces effected along a memory cell of the array of FIG. 3A during the operation of the array.

FIG. 3A depicts another embodiment of a memory array according to the present invention which operates similarly to that shown in FIG. 1 and described hereinbefore. Magnetic wire memory elements $31_1$ through $31_3$, which may advantageously comprise conductors having tapes of magnetic material exhibiting substantially rectangular hysteresis characteristics helically wound therearound, are connected between a source of ground potential and both pulse source 32 and detection circuitry 33. Word solenoids $34_1$ and $34_2$ are transversely wrapped around the elements 31 defining memory cells at the segments of the elements 31 crossed by the solenoids 34. Each of the solenoids 34 has a tapered cross section as indicated in FIG. 3A. Each of the elements 31 is folded so that it is crossed twice by each of the solenoids 34, each elements 31 thereby passing first in one sense through the solenoids 34 and returning in the opposite sense through the solenoids. Solenoids 34 are connected between ground potential and pulse source 35. Timing circuit 36 is connected between pulse sources 35 and 32 by conductors 37 and 38, respectively.

Sources 35 and 32 are shown in block diagram form and may comprise well known circuits capable of providing signals of the character described hereinafter. Detection circuitry 33 is also shown in block diagram form and may comprise well known circuitry capable of detecting bipolar signals induced in the elements 31. Timing circuit 36, also shown in block diagram form, may comprise well known circuitry capable of timing the energization of sources 32 and 35 during the write phase of operation as described hereinafter.

A bit address is defined by the two segments of a single one of the elements 31 crossed by a single one of the solenoids 34. Each of the segments comprises a memory cell which in the operation of the array is analogous to the memory cells of the array depicted in FIG. 1. Thus when information is stored in a particular bit address one memory cell will be in a particular remanent magnetic condition along a particular length of its segment of element 31 while the other cell will be in said particular remanent magnetic condition along a different length of its segment of element 31.

The tapered cross section of the solenoids 34 cause a greater portion of currents applied to the solenoids from source 35 to travel through the thicker than through the thinner portion of the solenoids. As a result, a greater magnetizing force is applied to the portions of the memory cells adjacent the thicker edge than to those adjacent the thinner edge of the solenoids.

FIG. 3B depicts in graphical form the magnetizing forces applied to a particular memory cell during the operation of the embodiment of FIG. 3A. The points *a* and *b* on the L-axis represent the ends of an illustrative memory cell of FIG. 3A. Solenoids 34 have triangular cross sections and signals applied thereto therefore effect magnetizing forces which vary linearly from a particular value at one end of an adjacent memory cell to zero at the other end of the cell. The line $H_w$ on the H-axis of FIG. 3B designates the magnetizing field applied to the illustrative memory cell by a write signal applied to its associated solenoid 34. The line $H_c$ represents the coercive force of the illustrative memory cell. If the cell is assumed to be in an initial uniform state of remanent magnetization, which may be designated a reset condition, then a write signal applied to its solenoid of a polarity to reverse its magnetic state will not reverse the entire cell from *a* to *b* but will only reverse a portion of the cell corresponding to the distance $L_3$ shown in FIG. 3B.

Information is stored in the bit addresses of FIG. 3A by the simultaneous application of write signals from sources 35 and 32. If a particular bit address is in a reset magnetic state as a result of a previously applied negative read out signal on its associated solenoid 34, the positive write signal applied to its solenoid is of a magnitude sufficient to reverse the remanent magnetization along approximately half the length of both of the memory cells of the particular address. The simultaneous signal applied to the element 31 of the particular address produces a magnetizing force which aids in one cell of the particular address and opposes in the other, the magnetizing force produced by the signal on the solenoid. As a result, flux reversal occurs along more than half the length of one cell and less than half the length of the other cell of the particular address. The particular binary value stored in the address is manifested by which of its cells undergoes the greater flux reversal which in turn is governed by the polarity of the write signal applied to its element 31. The magnitude of the write signal applied to element 31 is insufficient, however, to cause any flux switching in memory cells whose associated solenoids 34 do not have write signals applied thereto simultaneously with the write signal on element 31. FIG. 3B also shows line $H_w+H_b$ and line $H_w-H_b$ which represent the magnetizing force applied to the illustrative memory cell by simultaneous additive and subtractive magnetizing forces, respectively, produced by simultaneous write signals applied to the solenoid 34 and wire element 31 of the illustrative cell. The additive forces effect flux reversal in a length of the illustrative cell corresponding to $L_2$ while the subtractive forces effect flux reversal in a length of the cell corresponding to $L_1$.

A particular binary word is interrogated by the application of a negative polarity read out signal from source 35 to the particular solenoid 34 associated with the word to be interrogated. The read out signal is of a magnitude sufficient to reestablish the reset magnetic condition in each memory cell associated with the particular solenoid. Signals induced in the magnetic wire memory elements 31 by the resetting of these cells are detected by circuitry 33, the polarity of these signals manifesting the binary values stored in respective addresses of the word being interrogated.

If the particular binary word 101, for example, is to be stored in the addresses defined by solenoid $\mathbf{34_1}$ and elements $\mathbf{31_1}$, $\mathbf{31_2}$, and $\mathbf{31_3}$, respectively, a positive write signal is applied to solenoid $\mathbf{34_1}$ from source 35 simultaneously with positive write signals applied to elements $\mathbf{31_1}$ and $\mathbf{31_3}$ and a negative write signal applied to element $\mathbf{31_2}$ from source 32. The resultant magnetizing forces effect flux reversals in the memory cells associated with solenoid $\mathbf{34_1}$ from a uniform reset condition to magnetic conditions which are different in the two cells of each bit address associated with this solenoid. The resulting magnetic conditions of the bit addresses defined by solenoid $\mathbf{34_1}$ and wire memory elements $\mathbf{31_1}$, $\mathbf{31_2}$, and $\mathbf{31_3}$ manifest stored binary values "1," "0," and "1," respectively. A subsequent negative polarity read out signal applied to solenoid $\mathbf{34_1}$ from source 35 reestablishes the reset magnetic condition in each of the memory cells associated with this solenoid thereby inducing negative output signals in wire elements $\mathbf{31_1}$ and $\mathbf{31_3}$ and a positive output signal in wire element $\mathbf{31_2}$. These output signals are detected by circuitry 33 thereby indicating that the binary word 101 had previously been stored in the interrogated addresses.

Other embodiments of this invention utilizing magnetic wire memory elements may also be devised by one skilled in the art. Thus, for example, differing magnetizing forces could be applied along the length of a segment of such an element by means of a solenoid one edge of which is positioned close to the element while the other edge is substantially removed from the element rather than by a solenoid having a tapered cross section.

It is to be understood that the specific embodiments of this invention described herein are merely illustrative and that numerous other arrangements according to the principles of this invention may be devised by one skilled in the art without departing from the spirit and scope of this invention.

What is claimed is:

1. A magnetic memory circuit comprising a plurality of parallel first conductors, a plurality of second conductors crossing said first conductors, each of said first conductors twice crossing each of said second conductors, a magnetic material having substantially rectangular hysteresis characteristics positioned in close proximity to both said first and second conductors at each of said crosspoints, a magnetic memory cell of predetermined length being defined at each crosspoint by said first conductor, said second conductor and said magnetic material; a bit address being defined by each pair of said cells defined by a single one of said first conductors and a single one of said second conductors, means for establishing a first remanent magnetic condition along the entire length of each memory cell of a selected one of said bit addresses, and means for establishing a second remanent magnetic condition along a first fractional length of one cell and along a second fractional length of the other cell of said selected bit address representative of a first binary value and for establishing said second remanent magnetic condition along said second fractional length of said one cell and along said first fractional length of said other cell representative of a second binary value.

2. A magnetic memory circuit according to claim 1 in which each of said second conductors is folded, said fold dividing the conductor into first and second substantially parallel portions, each of said first conductors crossing once each of said first and second portions of each of said second conductors.

3. A magnetic memory circuit according to claim 2 in which said means for establishing a first remanent condition along the entire length of each cell of a selected address comprises means for applying read out pulses of a first polarity to a selected one of said first conductors.

4. A magnetic memory circuit according to claim 3 in which said means for establishing a second remanent condition along fractional lengths of said cells comprises means for simultaneously applying a write pulse of a second polarity to a selected one of said first conductors and a write pulse of predetermined polarity to a selected one of said second conductors.

5. A magnetic memory circuit comprising a high magnetic permeability base plate having a bottom portion and a plurality of pairs of posts extending therefrom, an overlay magnetic sheet having substantially rectangular hysteresis characteristics positioned contiguous to said posts, means for establishing a plurality of magnetic cells, each cell including a pair of said posts and adjacent portions of said overlay material and said bottom portion and embracing a plurality of closed magnetic flux paths having different values of reluctance, a word conductor passing between the posts of a first one of said cells and between the posts of a second one of said cells in the same sense and a bit conductor passing betwen the posts of said first cell and between the posts of said second cell in opposite senses, means for establishing a first remanent magnetic condition in a portion of each of said first and second cells embracing all of their flux paths, and means for establishing a second remanent magnetic condition in a portion of said first cell embracing a first fraction of its plurality of flux paths and in a portion of said second cell embracing a second fraction of its plurality of flux paths representative of a first binary value and for establishing said second remanent magnetic condition in a portion of said first cell embracing said second fraction of its plurality of flux paths and in a portion of said second cell embracing said first fraction of its plurality of flux paths representative of a second binary value.

6. A magnetic memory circuit according to claim 5 in which the posts of each of said pairs of posts are positioned at an angle relative to each other.

7. A magnetic memory circuit comprising a plurality of wire memory elements each comprising an electrical conductor having a flux component axially coincident therewith, said flux component having a substantially rectangular hysteresis characteristic, each of said wire memory elements being doubled to present a first portion extending in one direction and a second portion extending in the opposite direction, a plurality of energizing conductor means inductively coupled to said plurality of wire memory elements and defining a plurality of information bit addresses on said doubled wire memory elements, each of said bit addresses comprising a first segment of predetermined length of said first potrion and a second segment of predetermined length of said second portion of a wire memory element, means for establishing a first remanent magnetic condition along the entire length of each segment of a selected one of said bit addresses, means for establishing a second remanent magnetic condition along a first fractional length of the first segment and along a second fractional length of the second segment of said selected bit address representative of a first binary value and for establishing said second remanent magnetic condition along said second fractional length of said first segment and along said first fractional length of said second segment representative of a second binary value and means for detecting the magnetic condition of said first and second segments.

8. A magnetic memory circuit according to claim 7 in which said plurality of energizing conductor means comprises a plurality of strip conductors positioned transversely to said wire elements and defining said bit addresses at the crosspoints of said conductors and said wire elements, each of said conductors being of considerably greater thickness along one of its edges than along its other edge.

9. A magnetic memory circuit according to claim 8 in which each said strip conductors exhibits a linear variation in thickness from one edge to its other edge.

10. A magnetic memory circuit according to claim 9 in which said means for establishing said second remanent magnetic condition along fractional lengths of said first and second segments of said selected bit address comprises means for simultaneously applying a write pulse of one polarity to the strip conductor associated with said selected bit address and a write pulse of predetermined polarity to the wire memory element associated with said selected address.

11. In a magnetic memory matrix the combination comprising a high magnetic permeability base plate, a magnetic sheet having substantially rectangular hysteresis characteristics positioned in proximity to said base plate, and means for completing a plurality of flux paths of differing magnetic réluctance between a particular portion of said base plate and a particular portion of said magnetic sheet, said last-mentioned means comprising a first and a second post extending from said base plate, said posts being positioned at one angle relative to each other such that they are close together at one end and substantially further removed from each other at their other end.

12. In a magnetic memory matrix the combination according to claim 11 further comprising means for establishing a first remanent magnetic condition in a first fraction of said flux paths and for establishing said first remanent magnetic condition in a second fraction of said flux paths.

13. In a magnetic memory matrix the combination comprising a high magnetic permeability base plate, a magnetic sheet having substantially rectangular hysteresis characteristics positioned in proximity to said base plate, means for completing a first plurality of flux paths of differing magnetic reluctance between a first portion of said base plate and a first portion of said magnetic sheet, means for completing a second plurality of flux paths of differing magnetic reluctance between a second portion of said base plate and a second portion of said magnetic sheet, and means for establishing a first remanent magnetic condition in a first fraction of said first plurality of flux paths and in a second fraction of said second plurality of flux paths representative of a first binary value and for establishing said first remanent condition in a first fraction of said second plurality of paths and in a second fraction of said first plurality of paths representative of a second binary value.

References Cited by the Examiner

UNITED STATES PATENTS

| | | | |
|---|---|---|---|
| 2,825,891 | 3/1958 | Duinker | 340—174 |
| 2,825,892 | 3/1958 | Duinker | 340—174 |
| 3,105,962 | 10/1963 | Bobeck | 340—174 |
| 3,218,614 | 11/1965 | Kilburn | 340—174 |

BERNARD KONICK, *Primary Examiner.*

M. S. GITTES, *Assistant Examiner.*